United States Patent [19]
Tan

[11] 3,812,526

[45] May 21, 1974

[54] LOW LIGHT LEVEL TELEVISION CAMERA

[75] Inventor: Sing Liong Tan, Emmasingel, Netherlands

[73] Assignee: U.S. Philips Corporation, New York, N.Y.

[22] Filed: Oct. 4, 1972

[21] Appl. No.: 294,910

[30] Foreign Application Priority Data

Oct. 9, 1971 Netherlands ........................ 7113890

[52] U.S. Cl. .......................... 358/42, 250/213 VT

[51] Int. Cl. .............................................. H04n 9/08

[58] Field of Search ........... 250/213 VT; 178/5.4 R, 178/5.4 CF

[56] References Cited

UNITED STATES PATENTS 3,715,486 2/1973 Wright et al. .................... 178/5.4 R

OTHER PUBLICATIONS

RCA Technical Note No. 556 March, 1964.

*Primary Examiner*—Robert L. Richardson

*Attorney, Agent, or Firm*—Frank R. Trifari; Carl P. Steinhauser

[57] ABSTRACT

A color television camera arrangement for low light levels comprising a monochrome light intensifier. A rotatable color filter having circular segments of different light transmission characteristics is provided before the light intensifier. Rotatable apertured discs which intermittently and alternately pass the light to camera tubes follow the light intensifier. Protruding parts or apertures of a disc correspond to determined segments of the color filter. Instead of the apertured discs liquid crystals which pass or do not pass light can be used.

9 Claims, 4 Drawing Figures

LOW LIGHT LEVEL TELEVISION CAMERA

Figure 1:
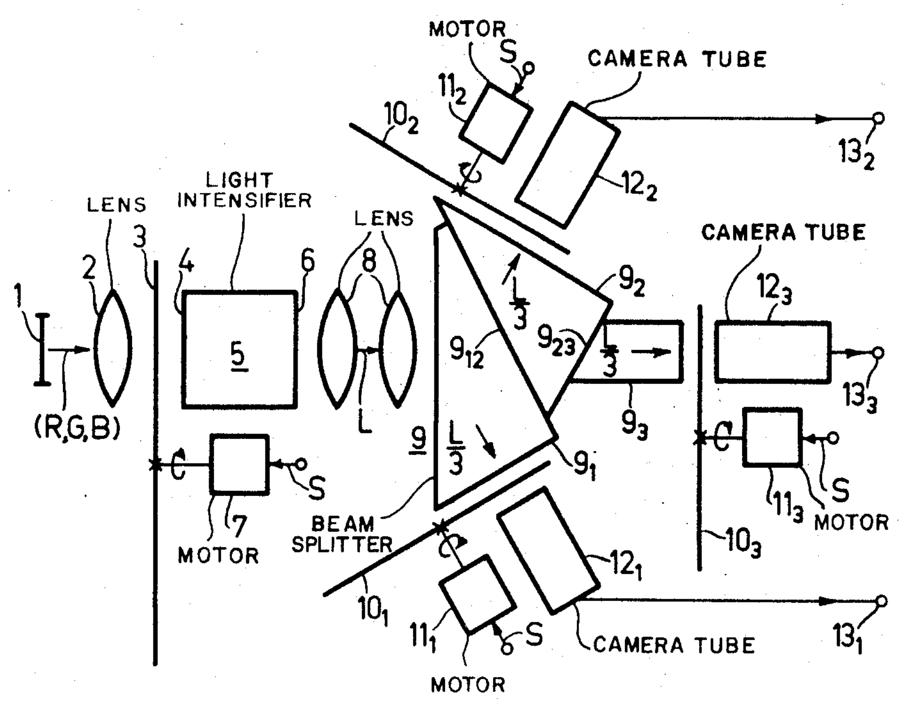

The invention relates to a camera arrangement for processing a scene having a low light level with the aid of a monochrome light intensifier in which arrangement a color filter is provided.

A camera arrangement of this kind is described in U.S. Pat. No. 3,231,746. Via the camera arrangement and the light intensifier an observer can see a scene whose low light level makes it insufficiently possible to observe it with the naked eye. The color filter is provided in order to be able to observe the scene in the actual colors while using a monochrome light intensifier or an intensifier supplying one color.

The color filter described comprises two circular filter discs each rotatably provided before and behind the monochrome light intensifier, which discs each comprise groups of circular segments having different light transmission characteristics. Dependent on the determined light transmission characteristic of a circular segment, light having a determined color is passed. When a circular segment passing, for example, red colored light is locally provided before and behind the light intensifier, the result is that the red light originating from the scene is incident on the light intensifier and is subsequently intensified by the monochrome light intensifier and leads to a white colored image on the display screen from which image the red light present therein is filtered through the circular segment placed behind the light intensifier. The same is subsequently effected, for example, for a green and a blue light component. By rotating the filter discs it is thus achieved that the observer could successively observe a red, a green and a blue colored image of the scene. By rotating the filter disc so fast that the (inert) eye no longer can follow the changes in color, the observer observes the scene in its actual colors.

To be able to observe the actual colors it is necessary that the monochrome light intensifier produces a pure white image. In practice a layer luminescing pure white light is found to have a low efficiency. In order to satisfy the requirement of white light, a special structure of the display screen of the intensifier can be proposed. The embodiment of the display screen including grains having, for example, a blue and a yellow luminescence, so that the combination yields white light, gives the image a granular structure having a low resolving power.

In addition, as described in the Patent Specification, there are problems relating to the persistence period of the luminescent layer which limits the highest rotational speed of the color filter. At comprartively high rotational speeds stronger cross-talk effects occur between the different circular segments of the colour filter.

Practice shows that a simple replacement of the previously described observer by a standard color television camera does not lead to an acceptable television image quality.

An object of the invention is to provide a camera arrangement which is suitable for use in color television in which a scene of low light level is brought to a television image of high quality. To this end the camera arrangement according to the invention is characterized in that the arrangement is provided with at least two television camera tubes before which means transmitting light periodically in an intermittent manner are provided so that the transmission of light to the different camera tubes is effected alternately, the color filter provided before the monochrome light intensifier having an alternately different colour light transmission characteristic which alternates synchronously with the successive light transmissions to the different camera tubes.

Figure 2:
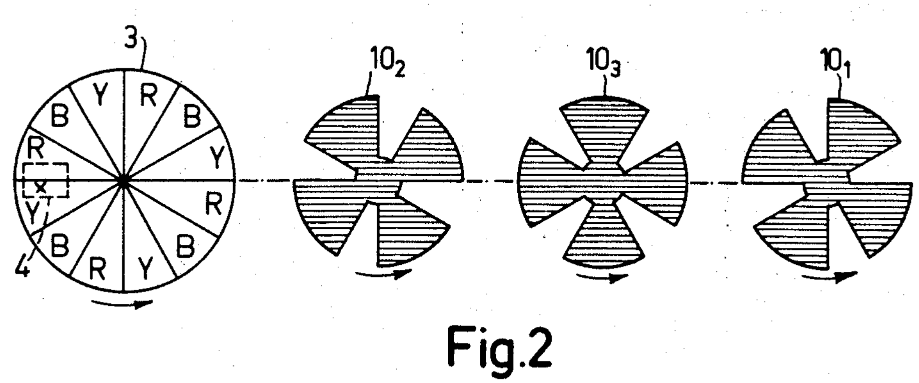
Figure 3:
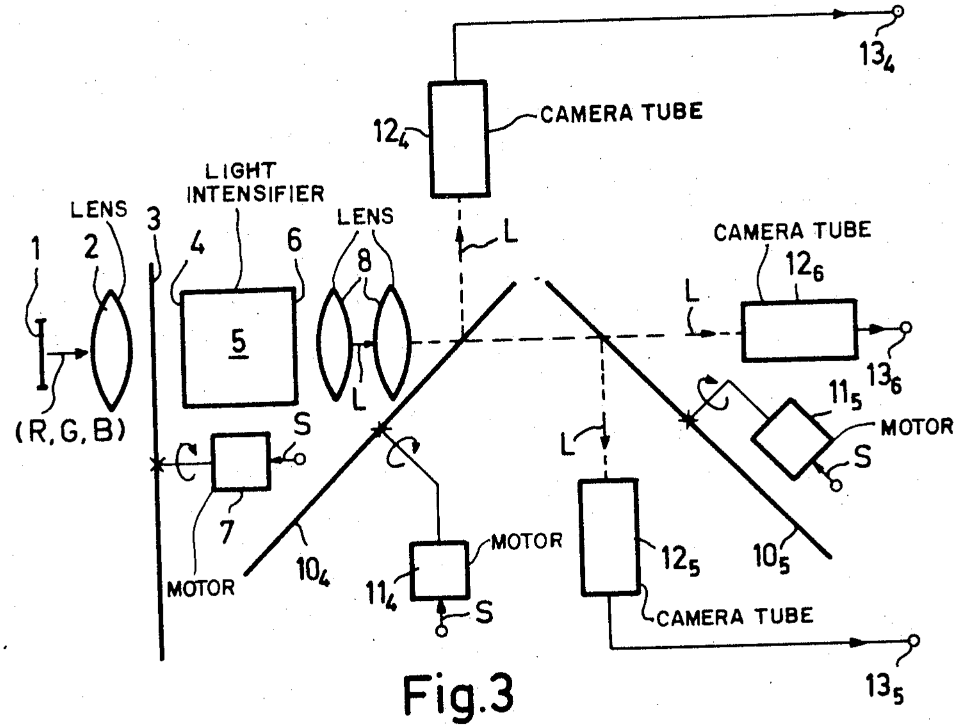

The invention will be described in detail with reference to the following figures as examples in which FIG. 1 diagrammatically shows an embodiment of a camera arrangement according to the invention suitable for color television, FIG. 2 serves to explain the operation of the arrangement according to FIG. 1, FIG. 3 shows a further embodiment and FIG. 4 serves to explain the operation of the arrangement according to FIG. 3.

FIG. 1 shows a camera arrangement which is suitable for use in a color television system and which can process a scene 1 having a low light level. The weak light denoted by an arrow (R, G, B) originating from the scene 1 may have a variety of colors. Starting from the primary colors red (R), green (G) and blue (B) commonly used in color television the various other colors are combinations of the primary colors in which particularly the color white is denoted by $Y=R+G+B$.

The light from the scene 1 is projected through an objective lens 2 and a colour filter 3 onto a pick-up side 4 of a light intensifier 5 which furthermore includes a display screen 6. FIG. 2 shows an embodiment of the color filter 3. Filter 3 is constituted as circular disc having circular segments of different light transmission characteristics (R, B and Y). FIG. 2 shows four groups of three segments R, B and Y, but a different number is alternatively possible. As is shown in FIG. 1, the color filter 3 is rotated in front of the light intensifier 5 tensifies the light of any color whatsoever incident on a synchronizing signal S is applied to the motor 7. The rotational speed of the color filter 3 may therefore be such that each group of the segments R, B and Y is rotated in front of the pick-up side 4 of the light intensifier 5 during a television field period. An even multiple of this rate is alternatively possible. Filter 3 and motor 7 are jointly active as a color filter (3, 7) having an alternately different color light transmission characteristic.

The specific embodiment of the light intensifier 5 is irrelevant; it is only important that the intensifier 5 intensifies the light of any color whatsoever incident on the pick-up side 4 and produces an image of the scene 1 in one color on the display screen 6. An arrow denotes the light L originating from the display screen 6 which light is applied through a system of lenses 8 to a beam splitter 9.

The color of the light L is not important, but starting from the present-day availability of blue luminescent layers having a high efficiency, the display screen 6 could be formed with such a layer.

The beam splitter 9 splits up the light L in three parts namely in, for example, three equal components, L/3. It is emphasized that color separation is not used in this case but that only a simple beam splitting is effected. To this end the beam splitter 9 is formed, for example, with three parts $9_1$, $9_2$ and $9_3$. Mirrors $9_{12}$ and $9_{23}$ partially passing light are provided between the parts $9_1$ and $9_2$, and between $9_2$ and $9_3$, respectively, in which two thirds of the incident light L goes from part $9_1$ to part $9_2$ and half of it goes to part $9_3$. Other distributions of the light L are alternatively possible.

Means $10_1$, $10_2$ and $10_3$ are provided near the parts $9_1$, $9_2$ and $9_3$, respectively, of the beam splitter 9 which means can alternately pass light in an intermittent manner. FIG. 2 shows the means $10_1$, $10_2$ and $10_3$ in greater detail as so-called apertured discs, that is to say, opaque discs provided with segment-shaped apertures. The apertured discs $10_1$, $10_2$ and $10_3$ of FIG. 2 are each formed as circular discs having four apertures in the form of circular segments. The discs $10_1$, $10_2$ and $10_3$ are rotated according to FIG. 1 by motors $11_1$, $11_2$ and $11_3$ which are synchronized with the aid of the said synchronizing signal S. The means (10, 11) thus formed which alternately pass light in an intermittent manner may alternatively be coupled together mechanically and to the rotating color filter (3, 7) so as to ensure the same rotational speed and a given position.

The apertured discs $10_1$, $10_2$ and $10_3$ are followed by television camera tubes $12_1$, $12_2$ and $12_3$ which under the influence of the incident light generate television picture signals becoming available at terminals $13_1$, $13_2$ and $13_3$. The television camera tubes 12 may be of an arbitrary type and are, for example, of the vidicon type. Deflection, focussing and signal processing circuits required for the camera tubes 12 are not shown, although they are of course necessary for the operation of the camera arrangement (2–13).

The operation of the camera arrangement (2–13) according to FIG. 1 will be described with reference to FIG. 2. In FIG. 2 a point $x$ is denoted near the color filter 3 in the plane of the pick-up side 4 of the light intensifier 5. Filter 3 rotates before point $x$. In the position shown of filter 3 there applies that prior to the instant shown the point $x$ has received white light through the segment Y during one third of a television field period. After the instant shown point $x$ will receive red light through the segment R. After one third of a field period blue light will be incident on point $x$ through the segment B.

Independent of the given color of the light incident on point $x$ in FIG. 2, the light L of FIG. 1 is generated and is split up through the beam splitter 9 into three components L/3. Prior to the instant shown in FIG. 2 the left-hand aperture in the disc $10_1$ was in front of the camera tube $12_1$, while no light was passed through the discs $10_2$ and $10_3$ to the camera tubes $12_2$ and $12_3$. After the instant shown the disc $10_2$ can pass light through the left-hand aperture and subsequently the disc $10_3$ can pass light to the camera tubes $12_2$ and $12_3$, respectively. It is found that the camera tubes $12_1$, $12_2$ and $12_3$ alternately receive light of the same color during one third of each field period from the light intensifier 5 which light corresponds to the white, the red and the blue light, respectively, originating from the scene 1. In the camera tubes 12 the line and field deflection commonly used for television is effected in the normal manner. The terminals $13_1$, $13_2$ and $13_3$ therefore convey the usual picture signals which may be denoted as colour signals Y, R and B. Dependent on the choice of the colours of the light which is passed by the segments of color filter 3, any other combination of color signals is possible.

The picture signals occurring across the terminals 13 correspond to the picture signals which are generated with a normal color television camera operating on a simultaneous basis. Without using the light intensifier 5 a loss of light of one ninth might occur relative to the normal camera, namely one third caused by the apertured discs 10 multiplied by one third caused by beam splitting in the beam splitter 9. When using a light intensifier 5 having an intensification factor of, for example, 900 a factor of 100 remains theoretically for the camera arrangement (2–13) relative to the normal camera. Thus the camera arrangement (2–13) would still work at an optimum rate for light levels which are one hundredth of the levels normally required. A great economy in lighting costs and a more extensive field of application of the camera for scenes having a low light level which cannot be additionally illuminated is the result.

A summary of some advantages of the camera arrangemenr (2–13) of FIG. 1 may be the following:

The light intensifier 5 may generate the light L in any arbitrary colour. The display screen 6 may therefore be provided with a luminescent layer having the highest luminous efficiency and the shortest persistence period independent of the color.

Due to the color independence of the light intensifier 5 it is not necessary to generate light having a mixed color. A homogeneous luminescent layer may therefore be used so that there is no granular structure.

By using the apertured discs 10 the light passed by the color filter 3 is distributed on a yes-no basis among the camera tubes 12. Due to the abrupt transition light crosstalk, that is to say, light intended for one of the camera tubes 12 being also incident on another camera tube, is greatly reduced. Crosstalk can be completely avoided by making the apertures in the discs 10 slightly narrower than the segments Y, R and B of the color filter 3.

In the embodiment shown in FIG. 2 of the color filter 3 with the segments R, B and Y the three discs $10_2$, $10_3$ and $10_1$ are required to cause the camera arrangement (2–13) according to FIG. 1 to generate the color signals R, B and Y at the terminals $13_2$, $13_3$ and $13_1$. The same color signals R, B and Y may alternatively be generated when the discs $10_2$ and $10_3$ only are present, hence when disc $10_1$ is absent if the color filter 3 were formed with segments R, B, G instead of R, B, Y. The result is that the camera tubes $12_2$ and $12_3$ each receive light corresponding to R and B through the apertured discs $10_2$ and $10_3$ during one third of a field period, while the camera tube $12_1$ is exposed to the light during each complete field period for which there applies that $R + B + G = Y$. By giving the mirror $9_{12}$ a reflection with a quantity of light of 1/7 L incident on the tube $12_1$, a quantity of light of 3/7 L is reflected and passed through the semipermeable mirror $9_{23}$. Since the apertures $10_2$ and $10_3$ give a reduction of one third, the result is that each camera tube 12 processes the same quantity of light during each field period.

It has been described hereinbefore that the embodiment shown in FIG. 2 of the color filter 3 and the apertured discs $10_1$, $10_2$ and $10_3$ combined gives a light reduction of one ninth relative to a standard camera (without taking into account the operation of light intensifier 5). In an R, B, G embodiment of the color filter 3 and use of two discs $10_2$ and $10_3$ only, the reduction factor is reduced to one seventh, which is more favorable.

Figure 4:
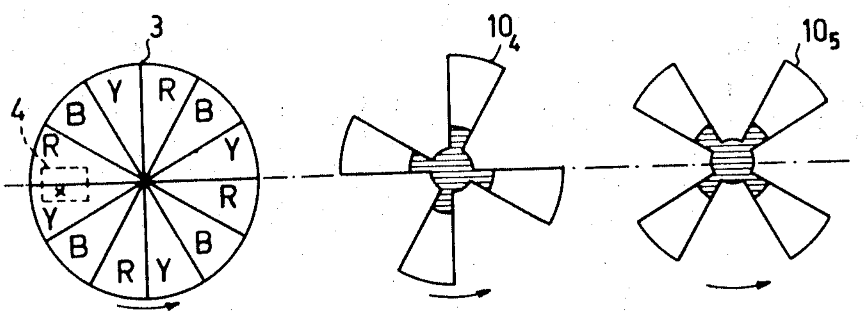

FIG. 3 shows an embodiment of a camera arrangement (2–13) according to the invention in which a still smaller reduction factor occurs, references already shown in FIGS. 1 and 2 are used in the same and similar manner as in FIG. 3 and in FIG. 4 which serves for the explanation of the operation of the arrangement.

In FIG. 3 the system 8 of lenses is directly followed by an operating disc $10_4$ which is formed according to FIG. 4 with completely reflecting, specular parts (not shaded) on the protruding parts. When a protruding part is present in the light L, this light is reflected to a camera tube $12_4$ through the disc $10_4$ provided at an angle of, for example, 45° and being rotated by a synchronized (signal S) motor $11_4$. A second disc $10_5$ which is rotated by a synchronized motor $11_5$ follows disc $10_4$. When the light L passes disc $10_4$ and is incident on a protruding, specular part of disc $10_5$, the light is reflected to a camera tube $12_5$. As the embodiment and the position of the discs $10_4$ and $10_5$ in FIG. 4 show, it is alternatively possible for the light L to pass the disc $10_5$ and then be incident on a camera tube $12_6$.

A comparison of the positions of colour filter 3 and discs $10_4$ and $10_5$ in FIG. 4 will explain the operation of the camera arrangement. The light L which is generated by the light intensifier 5 and which corresponds to the red light R originating from the scene 1 is processed through the disc $10_4$ by the camera tube $12_4$, so that a terminal $13_4$ conveys the color signal R. The light L which corresponds to the blue light B of the scene 1 reaches the camera tube $12_5$ by means of the disc $10_5$ so that a terminal $13_5$ conveys the color signal B. The white light Y originating from scene 1 passes the two discs $10_4$ and $10_5$ so that a terminal $13_6$ at camera tube $12_6$ conveys the signal Y.

The embodiment of the camera arrangement (2–13) described with reference to FIGS. 3 and 4 provides the extra advantage relative to the previously described embodiments that, as compared with the normal camera, a light reduction only one third occurs which is solely determined by the color filter 3.

It has been stated with reference to the apertured discs $10_1$, $10_2$ and $10_3$ of FIG. 2 that crosstalk may occur by making the apertures in these discs narrower than the segments of color filter 3. This prevention of crosstalk can be achieved in the disc embodiment according to FIG. 4 by broadening the protruding parts of the discs $10_4$ and $10_5$ and by making the specular, reflecting part thereon narrower than that shown. The narrower form of the specular part prevents crosstalk between the tubes $12_4$ and $12_5$ and the broadening of the protruding parts prevents crosstalk between the tubes $12_4$ and $12_5$ on the one hand and the tube $12_6$ on the other hand.

The synchronously rotating apertured discs 10 are given as embodiments for means which periodically pass light to the camera tube 12 in an intermittent manner. Such a mechanical solution may be replaced by an electrical one by using optical filters having liquid crystals whose light transmission is dependent on an electrical voltage applied across the crystal. The means (10, 11) of FIG. 1 may be simply replaced by such liquid crystals which are rendered alternately light transmissive in synchronism with the changes in color of color filter 3. By providing reflecting layers in a crystal construction the means (10, 11) of FIG. 3 may be formed therewith. Also for colour filter 3 a non-mechanical solution may be considered in which light transmission or no light transmission is not considered but rather a different color light transimission characteristic dependent on an electrical voltage applied across a liquid crystal.

What is claimed is:

1. A camera arrangement for processing a scene having a low light level comprising a monochrome light intensifier, at least two television camera tubes, a color filter between said light intensifier and said camera tubes, means to alternately and intermittently transmit light periodically to each of the camera tubes, and a color filter before the monochrome light intensifier having an alternately different color light transmission characteristic which alternates synchronously with the successive light transmissions to the different camera tubes.

2. A camera arrangement as claimed in claim 1, wherein said light means comprise a rotatable opaque disc having apertures and protruding parts, said apertures or protruding parts of an apertured disc corresponding to segments of the color filter, said color filter comprising a rotatable disc, said segments transmitting light having a given spectral distribution.

3. A camera arrangement as claimed in claim 2, wherein the protruding parts of the apertured disc corresponding to the segments of the color filter have reflecting parts.

4. A camera arrangement as claimed in claim 3 wherein the protruding parts of the apertured disc are broader than the segments of the color filter.

5. A camera arrangement as claimed in claim 2, wherein said light transmitting means comprise a monochrome beam splitter which produces no color separation, said apertured discs whose apertures correspond to the segments of the color filter being provided between the beam splitter and said camera tubes.

6. A camera arrangement as claimed in claim 5, wherein the width of the apertures of the apertured disc is smaller than that of the segments of the color filter.

7. A camera arrangement as claimed in claim 5, wherein the beam splitter comprises mirrors partially passing light.

8. A camera arrangement as claimed in claim 1, wherein said light transmitting means comprise a monochrome beam splitter which produces no color separation, and includes liquid crystals which are selectively light-transmissive and are controlled synchronously with the changes in transmission characteristics of the color filter provided between the beam splitter and said camera tubes.

9. A camera arrangement as claimed in claim 1 wherein the monochrome light intensifier comprises a luminescent homogeneous layer on a display screen.

* * * * *